United States Patent [19]
Herr

[11] 4,386,291
[45] May 31, 1983

[54] MULTI-LEVEL ARMATURE WINDING FOR SINGLE AIR GAP MOTOR

[75] Inventor: John A. Herr, Garwood, N.J.
[73] Assignee: The Singer Company, Stamford, Conn.
[21] Appl. No.: 329,631
[22] Filed: Dec. 11, 1981
[51] Int. Cl.³ .............................................. H02K 3/16
[52] U.S. Cl. ..................................... 310/225; 310/207
[58] Field of Search ................ 310/233, 43, 220–225, 310/204–208, 265, 264

[56] References Cited

U.S. PATENT DOCUMENTS

| | | | |
|---|---|---|---|
| 2,112,506 | 3/1938 | Schwarz. | |
| 2,668,926 | 2/1954 | Johnson | 310/225 X |
| 3,891,876 | 6/1975 | Herr et al. | 310/43 |
| 3,909,645 | 9/1975 | Herr et al. | 310/43 X |
| 4,063,123 | 12/1977 | Herr et al. | 310/233 X |
| 4,143,606 | 3/1979 | Herr. | |

OTHER PUBLICATIONS

U.S. Pat. Appln. Ser. No. 051,333, filed 6/22/79.

*Primary Examiner*—Donovan F. Duggan
*Attorney, Agent, or Firm*—William V. Ebs; Robert E. Smith; Edward L. Bell

[57] ABSTRACT

A single air gap motor is provided with inner and outer coil wires in armature slots. Inner and outer coils with the same number of turns are symmetrically distributed around the armature and are connected in series with inner and outer coils alternating in the connection to balance out back E.M.F.

8 Claims, 4 Drawing Figures

MULTI-LEVEL ARMATURE WINDING FOR SINGLE AIR GAP MOTOR

BACKGROUND OF THE INVENTION

1. Field of the Invention:

In dynamoelectric machines of the single air gap type utilizing rare earth magnets as disclosed, for example, in U.S. Pat. No. 3,891,876 for "Permanent Magnet Electric Motor Having a Non-Ferrous Solid Armature", and U.S. Pat. No. 4,063,123 for "Rotor Winding Improvement" issued June 24, 1975 and Dec. 13, 1977, respectively to John A. Herr and Wolfgang Jaffe, multiple coils of wire have been used in armature slots to obtain a good slot fill while maintaining a small diameter rotor. Because of the greater velocity of the coils in the outer levels of the armature slots and therefor the greater induced back electromotive force (E.M.F.) in such coils as compared to the inner level coils, different numbers of turns have been provided in the inner and outer levels of previously used windings to balance out back E.M.F. and so prevent back torque from acting on the armature during operation of the motor.

While electrical balance could be achieved in this manner, the arrangement complicated the design of a motor and rendered automatic winding of the armature more difficult and time consuming.

It is a prime object of this invention to simplify the design of small diameter air gap motors having coils at different levels in armature slots, and to facilitate automatic winding of the armature.

It is another object of the present invention to provide a single air gap motor with an improved electrically balanced armature winding not requiring the use of different numbers of turns in coils at different levels in armature slots to prevent the generation of a resultant induced back E.M.F. affecting torque on the armature.

Other objects and advantages of the invention will become apparent during a reading of the specification taken in connection with the accompanying drawings.

SUMMARY OF THE INVENTION

In accordance with the invention, the armature of a single air gap motor is provided with a plurality of symmetrically distributed longitudinal slots and a commutator with equally spaced slots, having twice as many equally spaced discrete segments as armature slots. A plurality of coils are wound on the armature; some through the armature slots at one level, and others through the slots at another level. The coils at each level have the same number of turns as the coils at every other level, and the turns are distributed around the armature to provide the same number of coil wires at each of the different levels in the slots. The coils are connected in series through the commutator segments with the different level coils alternating in the connection between the segments to balance out induced back E.M.F. in the series connection and thereby prevent back torque on the armature during operation of the motor.

DESCRIPTION OF THE INVENTION

Figure 1:
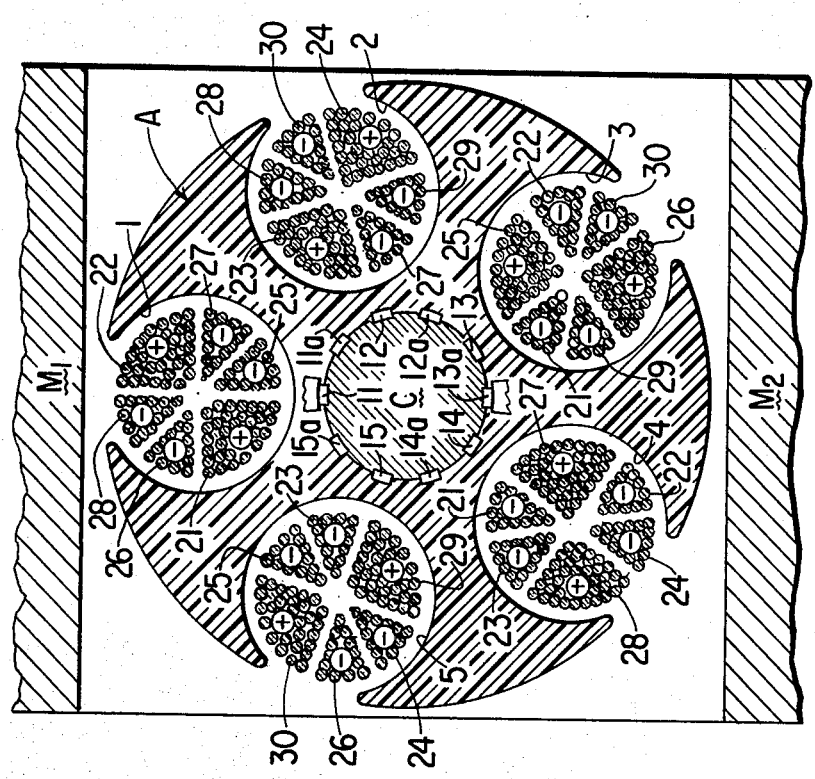
FIG. 1 is a diagramatic end view of a single air gap motor according to the invention showing the armature coils and commutator segments.

Referring to the drawings, reference character A designates the armature of a single air gap motor according to the invention. The armature, which is of a non-magnetic material, operates between rare-earth permanent magnets $M_1$ and $M_2$. As shown the armature is provided with five coil carrying slots 1, 2, 3, 4 and 5 although more or less may be provided. In any event, the slots are equally spaced around the armature as for example in the manner illustrated. The armature carries a commutator C which is provided with twice as many equally spaced discrete segments, numbered 11, 11a, 12, 12a, 13, 13a, 14, 14a, 15 and 15a in the drawings, as there are armature slots.

Coils 21, 22, 23, 24, 25, 26, 27, 28, 29 and 30 which are provided to extend through the various armature slots, individually connect at opposite ends to adjacent commutator segments. Half of these coils, namely the coils 21, 23, 25, 27 and 29 extend through an inner level of the armature slots and the other coils 22, 24, 26, 28 and 30 extend through an outer level of the slots. The inner and outer level coils are wound with the same numbers of turns and the turns of each coil are distributed about the armature as indicated in the drawings.

Figure 2:
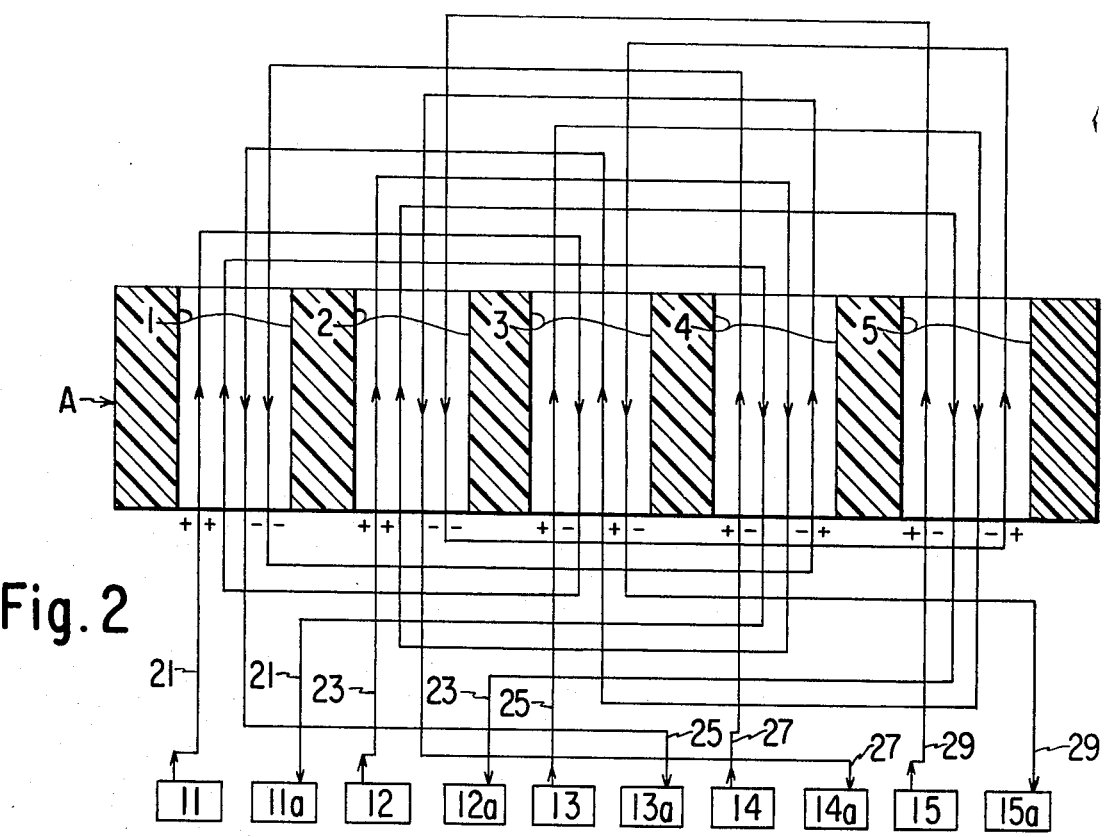
FIGS. 2 and 3 are schematic views illustrating the winding pattern for lower and higher level coils respectively in armature slots of the motor of FIG. 1.
Figure 3:
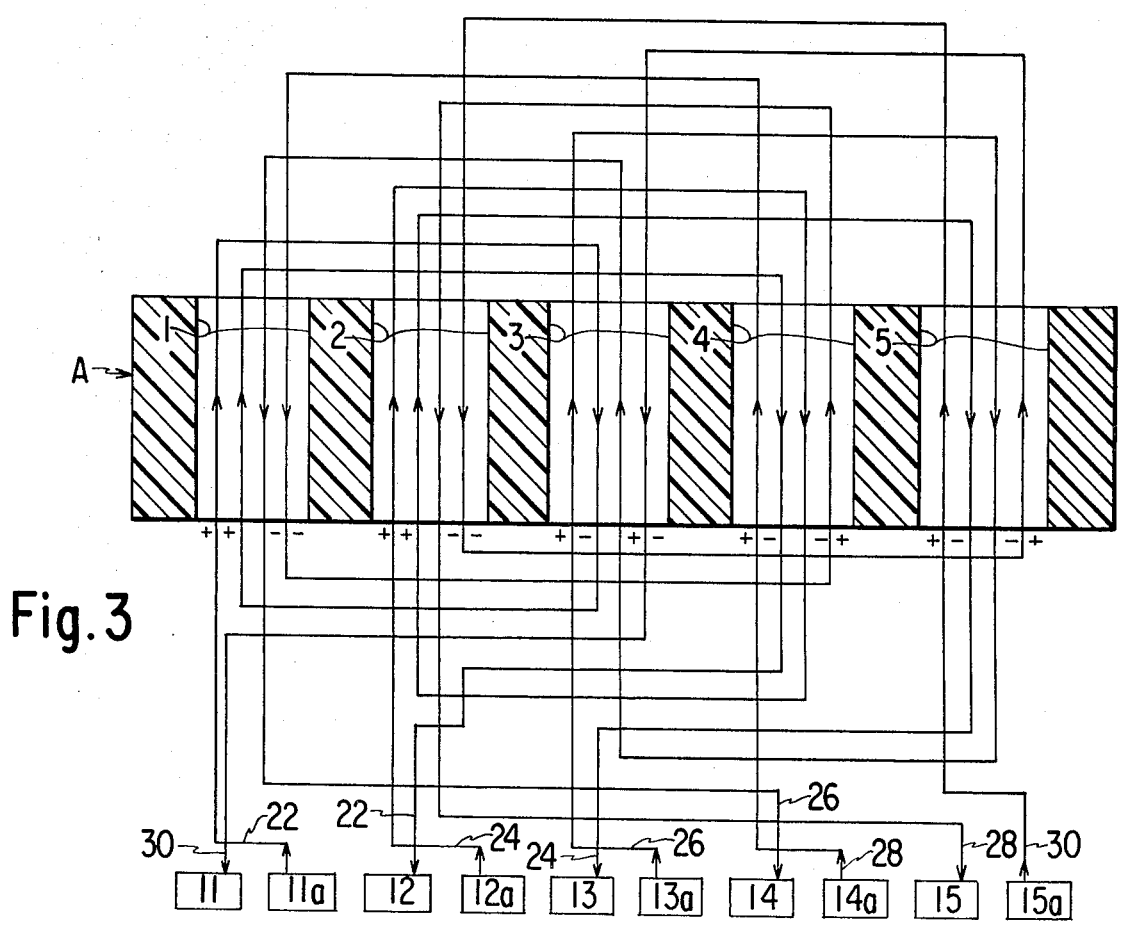

The winding pattern of coils 21 through 30 is best seen in FIGS. 2 and 3 where one set of characteristic turns is shown for each of the inner and outer level coils respectively. As shown in FIG. 2, inner level coil 21 connects at one end to commutator segment 11 and runs therefrom in one direction (+) through the armature in slot 1, then in the opposite direction (−) through slot 3 to complete one turn, after which the coil passes through slot 1 again in the (+) direction and through slot 4 in the (−) direction to complete a second turn. The described turns are wound repetitively through the inner level of the indicated slots and the free end is connected to commutator segment 11a.

Referring to FIG. 3, it may be seen that the outer level coil 22 connects at one end to commutator segment 11a and proceeds therefrom in the (+) direction through slot 1, then in the (−) direction through slot 3 to complete a first turn, after which the coil passes through slot 1 again in the (+) direction and through slot 4 in the (−) direction to complete a second turn. Such turns are wound repetitively through the outer level of said slots as indicated and the free end of the coil is connected to commutator segment 12.

Inner level coil 23 and outer level coil 24 are wound on the armature in a manner corresponding to the coils 21 and 22 respectively but through slots 2 (twice), 4 and 5 as indicated. However, coil 23 connects at opposite ends to commutator segments 12 and 12a, whereas coil 24 connects at opposite ends to commutator segments 12a and 13.

Figure 4:
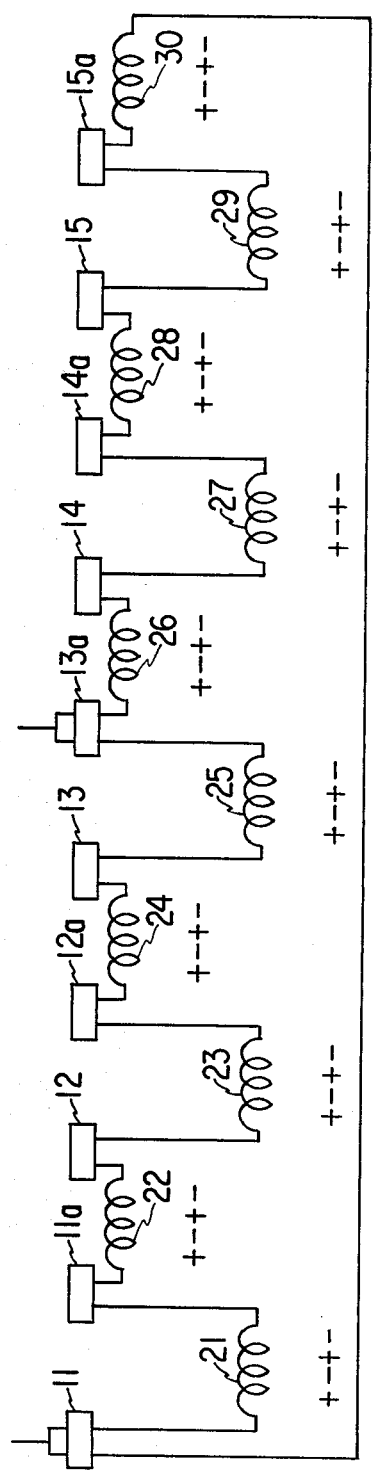
FIG. 4 is a circuit diagram illustrating the manner in which the coils are connected through commutator segments of the motor.

The remaining coils are arranged around the armature and directed through the various armature slots in a manner similar to that described for the coils 21, 22, 23 and 24 to provide with such coils a coil arrangement which is radially and circumferentially symmetrical in the armature. The inner and out level coils are all serially connected in alternating sequence through the commutator segments (see FIG. 4).

Having regard for the manner in which the coils are wound on the armature proceeding serially from one commutator to next as described it will be apparent that the same number of wires are carried in each level of every slot. In the inner level of slot 1, coil 21 provides half of the inner level wires (+ direction wires), and coils 25 and 27 provide the other half of the inner level wires (− direction wires). In the outer level of slot 1, coil 22 provides half of the outer level wires (+ direction wires) and the coils 26 and 28 provide the other half of the outer level wires (− direction wires). Each of the other slots carries + and − direction wires in an arrangement similar to that in slot 1.

Because of the greater velocity of outer level wires as compared to inner level wires a greater back E.M.F. is induced in the outer level coils than in the inner level coils having the same number of turns. However, the coils do not produce a net back E.M.F. affecting torque on the armature during operation of the motor. As described hereinbefore, the coils are serially connected with the inner and outer coils alternating in the connection. As a consequence of such electrical arrangement of the coils and the symmetrical spatial arrangement of the wires by the outer coils and the wires of the inner coils around the armature, the generation of a net back E.M.F. is avoided. Back E.M.F. induced in any of the outer coils at any particular time during operation the motor is balanced out in the series connection of coils by an equal and opposite back E.M.F. induced in the other outer coils. Similarly, back E.M.F. induced in any of the inner coils is balanced out in the series connection by an equal and opposite back E.M.F. induced in the other inner coils.

It is to be understood that various forms of the invention than that described herein are possible and that the disclosed embodiment is in no way to be construed as a limitation of the invention. Numerous alterations and modifications will suggest themselves to those skilled in the art, and all such modification which do not depart from the spirit and scope of the invention as intended to be within the scope of the appended claims.

I claim:

1. In a single air gap motor, an armature with a plurality of symmetrically distributed longitudinal slots; a commutator on the armature with equally spaced discrete segments, the number of segments being twice the number of armature slots; and a plurality of coils some of which are wound on the armature to extend through the armature slots at one level and others of which are wound to extend through the slots at another level, the coils at the one level having the same number of turns as the coils at the other level and the turns being distributed around the armature to provide the same number of coil wires at each of the different levels in the slots; said coils being symmetrically distributed around the armature and correspondingly connected in series one to another through the commutator segments with the different level coils in the connection arranged to alternate with one another and with the segments to balance out induced back E.M.F. in the series connection and thereby prevent back torque on the armature during operation of the motor.

2. The arrangement of claim 1 wherein the only coils wound on the armature are the coils extending through the slots at said one level and the coils extending through the slots at said different level.

3. The arrangement of claim 1 wherein each armature slot contains coil wires from at least six coils.

4. The arrangement of claim 1 wherein each armature slot contains coil wires at said one level from three coils one of which provides half of the one level wires, and each armature slot contains coil wires at said different level from three coils with one thereof providing half of the different level wires.

5. In a single air gap motor, an armature with a plurality of symmetrically distributed longitudinal slots; a commutator on the armature with equally spaced discrete segments, the number of segments being twice the number of armature slots; and a plurality of coils equal in number to the number of commutator segments, half of the coils being wound on the armature to extend through inner levels of the slots and the other half being wound to extend through outer levels of the slots; the inner and outer level coils having the same number of turns and the turns being distributed around the armature to provide the same number of coil wires in each of the inner and outer levels of the slots; said coils being symmetrically distributed around the armature and correspondingly connected in series one to another through the commutator segments with the inner and outer level coils in the connection arranged to alternate with one another and with the segments to balance out induced back E.M.F. in the series connection and thereby prevent back torque on the armature during operation of the motor.

6. The arrangement of claim 5 wherein each inner level coil extending through slots of the armature is accompanied in the slots through which it passes by a similarly wound outer level coil.

7. The arrangement of claim 5 wherein each inner and outer level coil extends through more than two slots.

8. The arrangement of claim 5 wherein each inner and outer level coil extends through four slots and passes twice through the same slot.

* * * * *